Sept. 26, 1967     C. THOMSON     3,343,653
CONVEYOR BELTS
Filed March 15, 1965     6 Sheets-Sheet 1
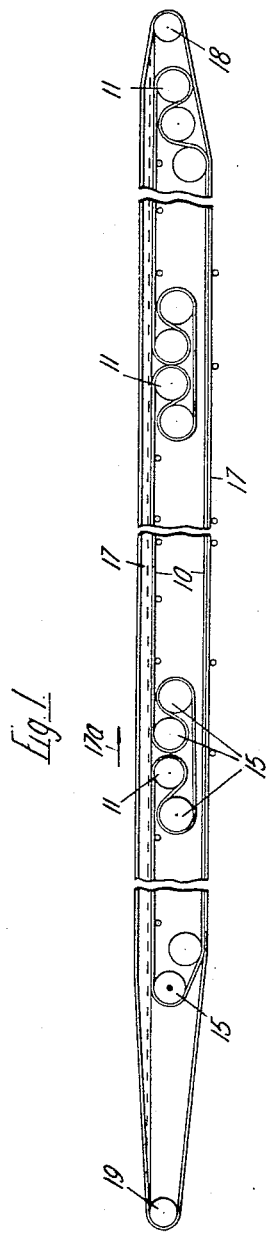
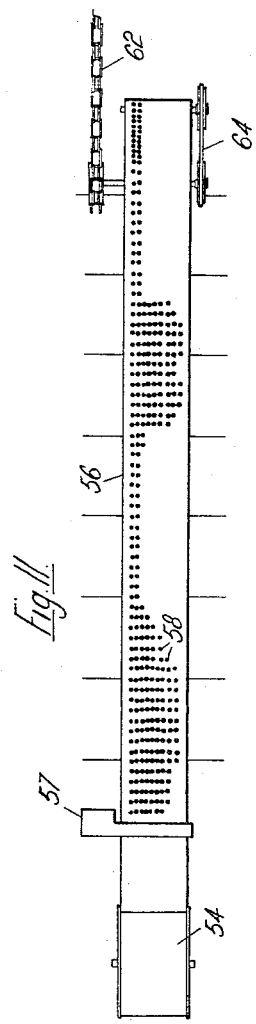
Inventor
Charles Thomson

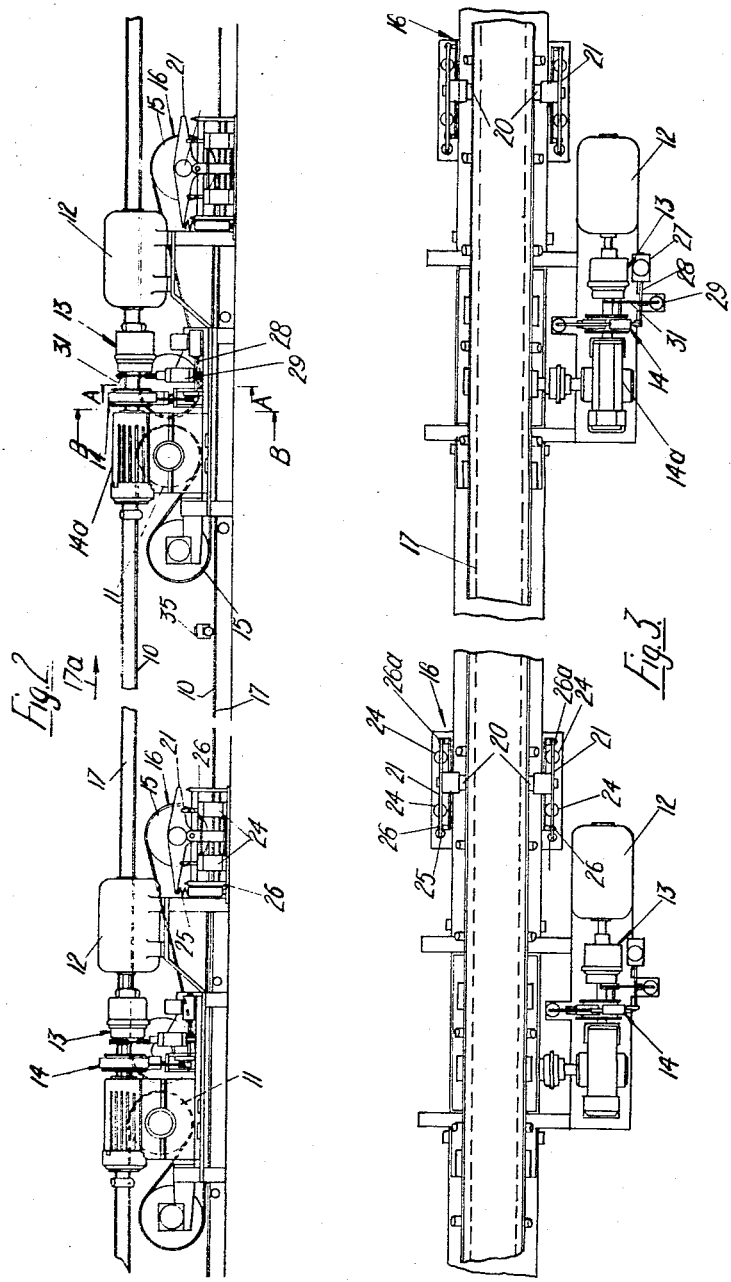

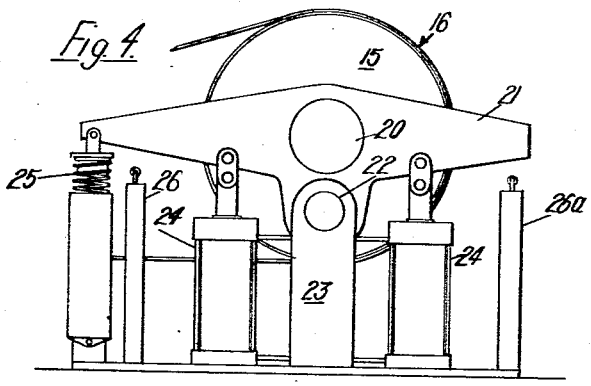
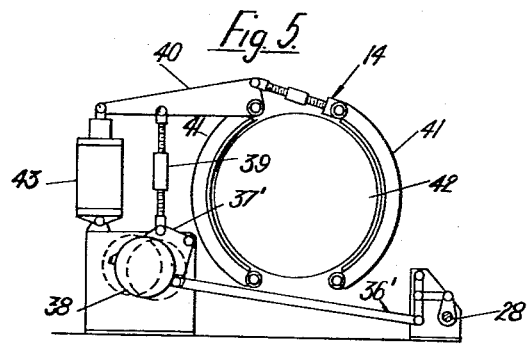
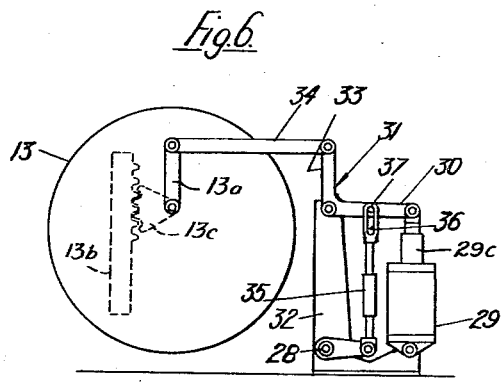

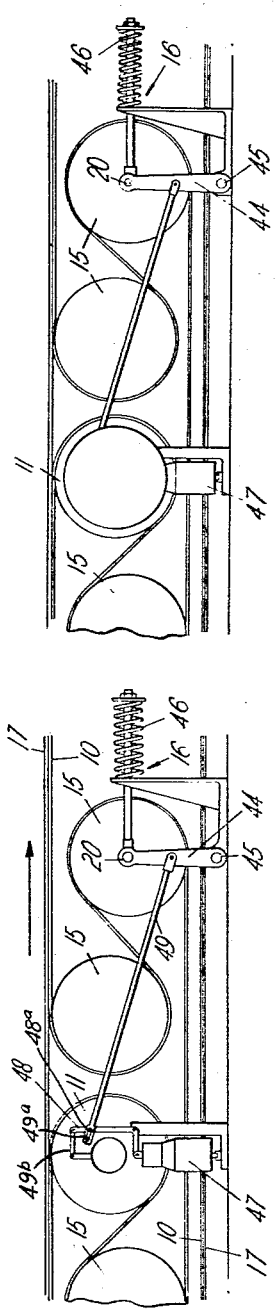

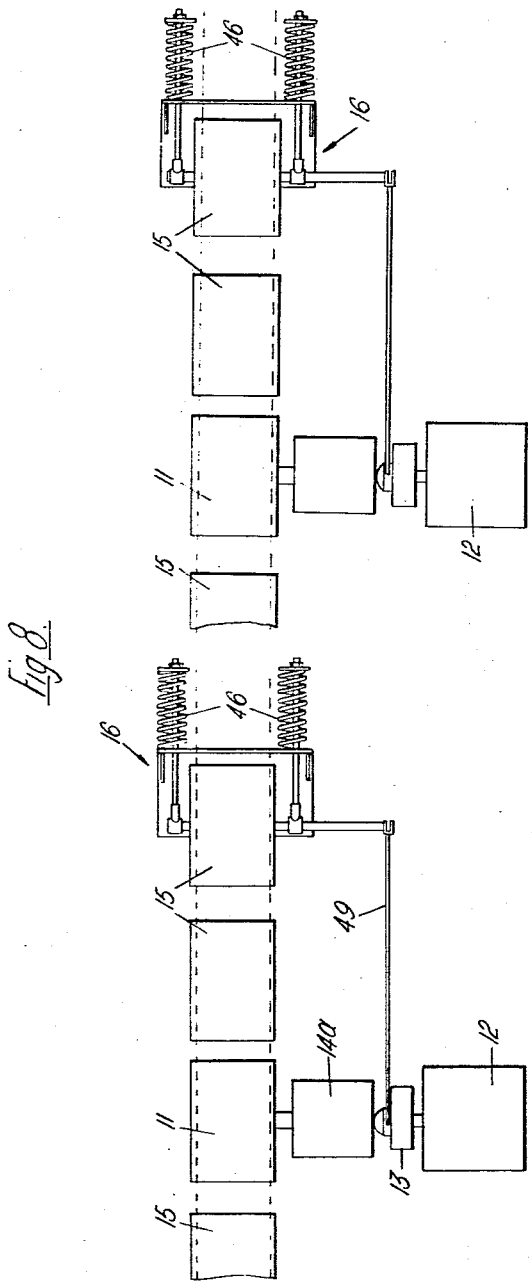

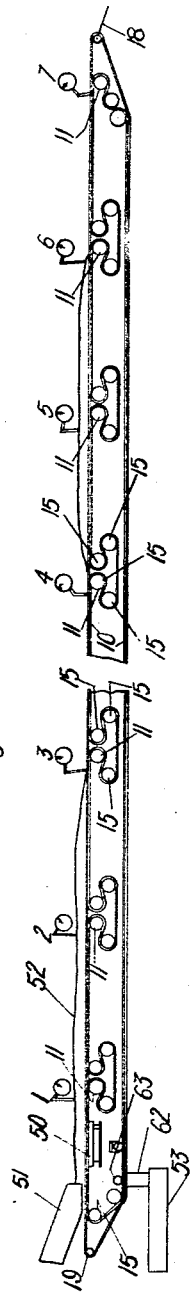

United States Patent Office 3,343,653
Patented Sept. 26, 1967

3,343,653
CONVEYOR BELTS
Charles Thomson, Esher, Surrey, England, assignor to Solar Thomson Engineering Company Limited, Cobham, Surrey, England
Filed Mar. 15, 1965, Ser. No. 439,558
Claims priority, application Great Britain, Mar. 18, 1964, 11,519/64
14 Claims. (Cl. 198—203)

This invention relates to improvements in belt conveyors, and particularly, but not exclusively, belt conveyors forming the subject of the prior patent application Ser. No. 332,519 filed December 23, 1963 now Patent No. 3,268,065.

In the construction of conveyor described in the specification of said prior application, the conveyor has an endless conveyor belt arranged to be driven either by a plurality of shorter endless driving belts each associated with its own motor drive or by a single driving belt with motor drives at spaced points along it. In the case of the plurality of driving belts, means independent of the conveyor belt is provided to ensure that when loading on the conveyor changes all said driving belts change speed by the same amount. In the case of the single driving belt, the mechanism at the driving points is so arranged that when one part of the conveyor is loaded, excess power in other unloaded or less heavily loaded parts of the conveyor is transmitted by the driving belt to said part of the conveyor. In both cases, all the motor drives generate approximately equal torque and, when one part of the conveyor is empty and another part is loaded, surplus power is generated by the motor driving the empty part and this surplus power is, in the case of the plurality of driving belts, transmitted by said belts and their interconnections to the loaded part and, in the case of the single driving belt, is transmitted by said belt to the loaded part.

The importance of eliminating such a transfer of tension in conveyors having a length in excess of about four miles will be understood from an example of the conveyor of the said patent application Ser. No. 332,519, which is two miles in length carrying 500 tons per hour with a lift of 500 feet at a speed of 400 feet per minute. When the conveyor is fully loaded over its full length, the maximum tension in the driving belt or belts will be of the order of 8,885 pounds, but when the conveyor is fully loaded for only half its length the maximum tension (owing to the transfer of tension) will rise to the order of 17,485 pounds, i.e., the tension has doubled under conditions of partial loading. While, on account of the driving means referred to above, this is not particularly detrimental where the length of the conveyor is less than about four miles, it is desirable to mitigate or obviate the effects of this increase in tension where the length of the conveyor is in excess of about four miles.

It has been proposed, in a conveyor having a single belt with drives at intervals along its length, to place just downstream of each drive unit a pair of switches arranged to retard the adjacent motor if the sag in the belt (over the few feet between adjacent idler rollers) increased and to retard the next motor downstream if the sag decreased. The arrangement was to be such as to be sensitive only to changes in sag due to changes in belt tension and not to sag changes due to changes in the weight of the load. An experimental conveyor employing this arrangement was not successful, such an arrangement requiring a speed of response which it is not practicable to provide. In the practice of the present invention, however, the only load changes that need to be considered are changes in the total loading of an entire driving belt section, some hundreds of feet in length. This total loading changes slowly enough for simple and robust apparatus both for measuring loading and for controlling drive power to be fully adequate.

The terms "upstream" and "downstream" are here used with reference to the flow of material along the conveyor.

According to the present invention, there is provided a belt conveyor having an endless conveyor belt and having arranged along the conveyor belt, in contact with it and extending over substantially the whole of its length and over substantially the whole of at least the central portion of the underside of its load-carrying flight (so as to drive the conveyor belt by friction between them) a plurality of shorter driving-belt sections with their own motor drives, in which the power required to be transferred between driving-belt sections is limited by means arranged automatically to control the motor drives in dependence on the loading of the conveyor over different driving-belt sections, whereby the motor drives supply more power when neighbouring regions of the conveyor are heavily than when they are lightly loaded.

The driving belt sections may be sections of an endless driving belt.

It is not necessary to separate out an indication of conveyor loading alone. Thus it is in accordance with this invention to obtain a direct indication of the power transferred between driving-belt sections from means responsive to the residual tension in the driving belt at the upstream ends of the driving-belt sections, and to use that indication to effect automatic control of the motor drives.

Alternatively, or additionally, means may be provided for measuring the amount of material fed to the conveyor belt, computing therefrom the loading of the various driving belt sections and effecting said automatic control of the motor drives in accordance with said measurement.

The following is a description, by way of example, of various embodiments of the present invention, reference being made to the accompanying drawings, in which:

FIGURE 1 is a side elevation of a belt conveyor according to the invention;

FIGURE 2 is a side elevation of part of the conveyor on a larger scale;

FIGURE 3 is a plan view of the part of the conveyor shown in FIGURE 2;

FIGURE 4 is an enlarged side view of part of the conveyor mechanism;

FIGURE 5 is a section on the line B—B of FIGURE 2;

FIGURE 6 is a section on the line A—A of FIGURE 2;

FIGURE 7 is a side view of part of a modified form of the conveyor in accordance with the invention; the left-hand part of the figure being a section on the line A—A of FIGURE 8;

FIGURE 8 is a plan view corresponding to FIGURE 7, with the conveyor belt omitted and the driving belt shown in broken lines for clarity;

FIGURE 9 is a side elevation of another embodiment of the conveyor in accordance with the invention;

FIGURE 10 is a side elevation of part of the control mechanism of the conveyor of FIGURE 9, and FIGURE 11 is a plan view corresponding to FIGURE 10 but with some parts omitted for clarity.

In the various figures, similar reference numerals denote similar parts.

Referring to FIGURES 1 to 6, a conveyor has an endless driving belt 10 trained in sinuous manner around a series of driving drums 11 spaced apart so that each driving drum is associated with its own driving belt section. Each driving drum is driven by a squirrel cage motor 12 through a hydraulic coupling 13 of the scoop control type, brake mechanism 14 and gear-box 14a. The coupling 13 has in conventional manner a control lever 13a which adjusts the height of a scoop 13b (see FIG. 6) so as to regulate the quantity of oil which is scooped up and returned to an impeller circuit. This height adjustment can be achieved in any known manner such as, for example, by means of a rack and pinion 13c, or by a lever and link, etc. The quantity of oil in the impeller circuit regulates the torque that is transmitted from an input impeller (which acts as a centrifugal pump) to an output runner which acts as an oil turbine driving an output shaft. Thereby, the torque transmitted by the coupling and the slip in the coupling can be controlled. Each driving drum 11 is associated with idler pulleys 15 to maintain the driving belt taut and one of said idler pulleys at the upstream end of the driving belt section is a control pulley, forming part of a load-sensitive device 16. An endless conveyor belt 17 wraps the driving belt and is itself trained around end drums 18, 19 with the upper and the lower flights of the conveyor belt in engagement with the upper and the lower flights of the driving belt so that, during rotation of the driving belt, the conveyor belt is rotated in the direction of arrow 17a solely by frictional engagement with the driving belt.

Each load-sensitive device 16 comprises a pulley 15 mounted on a shaft 20 projecting at both ends from the pulley, an arm 21 mounted on each end of the shaft and pivoted at 22 for limited movement in an arc about an axis extending transversely of the conveyor in a bracket 23 mounted on a fixed part of the conveyor, two dashpots 24 located on each side of the bracket and serving to cushion downward movement of each end of each arm 21, and spring means 25 connected to one end of each arm 21 and serving normally to maintain said arms horizontal. Located below and adjacent to the ends of each arm 21 are switches 26, 26a engageable by the arms during pivotal movement thereof. Each switch 26, 26a is operatively connected to a control motor 27 associated with the motor 12 downstream of the motor 12 to which the load-sensitive device is adjacent, said control motor 27 having a control shaft 28 operatively connected to the brake mechanism 14 and to the scoop of the hydraulic coupling 13 associated with said downstream motor 12. Switches 26 are arranged, when actuated, slowly to withdraw said scoop and the switches 26a are arranged, when actuated, slowly to engage said scoop.

Each scoop is operable by a thruster 29 connected to the free end of one limb 30 of a bell-crank lever 31 pivoted to a fixed part 32 of the conveyor, the other limb 33 being connected by a lever 34 to the scoop. A vertical link 35 operatively connected to the control shaft 28 has at its upper end a longitudinal slot 36 in which is slidable a pin 37 projecting from the limb 30 of the bell-crank lever associated with the thruster 29. The thruster 29 is a conventional thruster, e.g. an electro-hydraulic thruster which comprises an electric motor connected to an impeller. When the motor is switched on it rotates the impeller thereby causing pressure to build up in the fluid and tends to raise a ram 29c. When the motor is switched off the ram 29c will tend to retract to its zero position as the fluid pressure returns to zero. The thruster operates at a constant thrust throughout its stroke. The thruster 29 is such that the turning moment it can apply to the bell crank lever 31 is less than that which can be applied by the link 35 connected to the control shaft 28.

The effect of each load-sensitive device 16 on the motor 12 downstream of the motor 12 to which said device is adjacent is that should the back-tension in the section of the driving belt 10 associated with said device rise appreciably above a pre-determined value, indicating that said downstream motor 12 is applying more power to said belt 10 than is required by its associated section of the conveyor, the pulley 15 of said device will pivot in the direction to cause the associated arms 21 to actuate the switches 26. Actuation of the switches 26 starts the control motor 27 of the next downstream drive which motor rotates its associated control shaft 28 in such a direction that the link 35, by means of the pin 37 within the slot 36, pulls the limb 30 of the bell-crank lever downwards against the action of the thruster 29, thereby moving the scoop control lever 13a by means of the limb 33 of the bell-crank lever and the lever 34 so as to raise the scoop 13b of the coupling 13 of said downstream motor 12 until the back-tension in the driving belt is reduced to said predetermined value. Should the back-tension fall below the required value, the pulley 15 will pivot in the opposite direction to cause the arm 21 to actuate the switch 26a which causes the control motor 27 to rotate in the opposite direction and turn the control shaft 28 so as to lift the link 35 which in turn allows the thruster 29 to push the limb 30 of the bell-crank lever up as far as the pin 37 in the slot 36 will allow. The movement of the bell-crank lever is transmitted from the limb 33 through the lever 34 to the scoop control lever 13a so as to lower the scoop 13b of the coupling 13 of said downstream motor until the back tension returns to said value. When the back tension reaches said predetermined value as a result of rotation of the control motor 27 in either direction, the arms 21 of the load-sensitive device 16 will move to release the switches 26 or 26a, as the case may be, and thereby stop the control motor 27. The control shaft will then remain in this position until subsequently moved again by actuation of switches 26 or 26a. It is desirable to provide for several inches of movement of the drum 15 of the control unit, so that changes in driving-belt length under sudden changes of tension may be taken up, and the control system thereby be given more time to operate.

It will be appreciated that the squirrel cage motors have a slip, depending upon the load. This might amount to 2½% between no load and full load, and the same is true of a hydraulic coupling, being for example, 3% between no load and full load. What the control gear achieves is that the total slip in all drives is the same, thereby ensuring identical belt speeds at each driving drum. By virtue of the variable engagement of the hydraulic coupling scoops, the power generated at each motor is in line with the needs of its section; for example, the fully loaded sections with the scoops fully engaged may have a combined slip of 2½ plus 3%—the lightly loaded sections would then operate with the same amount of slip, namely 5½%, despite the fact that they are under virtually no load conditions, due to the fact that the scoops are almost fully disengaged, and the amount of oil left in the hydraulic couplings will drive under the lightly loaded condition with the 5½% slip that is necessary to balance the system.

To guard against the possibility that the positions of the scoops, which are a measure of the torque required to keep the conveyor running, do not allow sufficient torque to be transmitted satisfactorily to start the conveyor from rest, a centrifugal switch 35' is associated with the return flight of the driving belt to permit all scoops to be engaged more fully if the belt has not attained full speed when the scoops, on re-start, have regained the positions they occupied when the conveyor stopped. When the conveyor has attained full speed under control of the centrifugal switch the centrifugal switch will open and the scoops will again be under control of the switches 26, 26a associated with the load-sensitive devices 16.

The switches 26, 26a of each load-sensitive device are operatively connected to the brake mechanism 14 of the associated downstream motor 12 to adjust the effort which can be exerted by said mechanism in step with adjustment of the scoop associated with said downstream motor, it being desirable that both the driving and the braking torques should be equal so that the undesirable transfer of tension is substantially obviated, both in driving and in stopping the conveyor. The reason for this is that if a conveyor is inclined either upwards or downwards, then when current is switched off, the tendency of the conveyor to stop and run backwards in the case of an uphill conveyor, or the tendency to continue to run downwards is the case of a downhill conveyor, must be provided for. With the above arrangement, the brakes on a lightly loaded section are only to be applied lightly. Otherwise an undesirable braking tension would originate on this section, and be transferred to assist the brakes on a heavily loaded section.

The control shaft 28 of the control motor 27 associated with each brake mechanism 14 is so operatively connected by a linkage 36' to a brake lever 37' along which is slidable a weight 38 controlling the braking effort that actuation of a switch of the associated load-sensitive device effects movement of the weight along the lever to adjust the brake leverage in dependence on the amount of which the control shaft 28 is rotated by the control motor 27. Thus obviously the braking effort is varied with the difference in torque required at each drive. The brake lever 37' operates the brake through a link 39 and a pivoted lever 40 which moves brake shoes 41 into and out of engagement with a brake drum 42 connected to the output shaft of the associated coupling 13. The weight 38 is normally lifted, during operation of the conveyor, by a thrustor 43 or a solenoid to release the brake.

A typical start-up sequence for the conveyor is as follows:

(1) Start up all electric drive motors 12;
(2) Energize the circuits of the control motors 27 so that if switches 26 or 26a are actuated by arms 21, the associated control motor or motors will operate; and
(3) Energize the circuits of the thrusters 29 and 43 so that the thruster motors operate and the thrusters 29 act through the limbs 30 and 33, the levers 34 and the control levers 13a to lower the scoops of the couplings 13 and allow torque to be transmitted by the couplings, while the thrusters 43 act on the levers 40 to lift the weights 38 and release the brakes.

Each thruster 29 can only move the limb 30 of its bellcrank lever, and consequently scoop control lever 13a, as far as the slotted link 35 and pin 37 will permit. The extent of this allowable movement is governed by the position of the link 35 as controlled by the control shaft 28 and is therefore a direct measure, made through the control motor 27, switches 26, 26a and arms 21, of the torque required.

In the event of the conveyor stopping, the power to the thrusters 29 and 43 will be switched off. The motors of the thrusters will therefore stop and as a consequence the thruster rams will retract and thereby, through the associated links and levers, disengage the scoops and allow the weights 38 to operate the brakes. The slotted links 35 allow the free withdrawal of the scoops. In lieu of a thruster, there may be provided other mechanism such as a motor or solenoid.

While the embodiment has been described in particular in connection with the use of squirrel-cage motors and hydraulic couplings, it will be understood that to achieve the same effects there may be used other motor drives such as slip-ring motors with resistances, variable speed motors, motors with variable speed mechanical devices or motors associated with hydraulic pumps.

In the embodiment which is described above, control of the tension in the conveyor is effected by sensing the residue of tension at the end of one section of the conveyor and adjusting, by way of an electric signal, the motor drive associated with that section of the conveyor. The signal has to be transmitted over the length of said section, which length may be several hundreds of yards. To obviate the necessity for transmitting a signal over this distance, the modification shown in FIGURES 7 and 8 may be used.

Except as hereinafter described, the conveyor of FIGURES 7 and 8 is of generally similar construction to that of FIGURES 1 to 6. In FIGURES 7 and 8, each load-sensitive device 16 comprises a spring-loaded control pulley 15 so located in relation to the adjacent downstream section of the conveyor that when the adjacent downstream section is completely unloaded, the tension in the part of the driving belt wrapping said pulley is at a maximum and when said downstream section is fully loaded, the tension on said part of the driving belt is at a minimum. The pulley has a shaft 20 mounted at each end in a bracket 44 pivoted at 45 in the conveyor frame for movement about an axis extending transversely of the direction of travel of the conveyor belt 17 and normally urged by springs 46 in a direction towards the downstream section and against the tension of the driving belt 10.

A thrustor 47 is operatively connected by a control lever 48 and a link 49b to each scoop to operate said scoop. The control lever 48 is linked by an arm 49 having a slotted end 49a to one bracket 44 of the adjacent control pulley in such wise that movement of said pulley will actuate said lever to operate the scoop although the thrustor is itself not powerful enough to effect movement of the pulley. Thus, the extent to which the scoop is operated is dependent on the position of the control pulley.

In operation, when the loading upon the downstream driving section falls, the power delivered to the downstream section by its own motor drive will not change (except to the extent that the change in loading alters the speed of the whole conveyor), but instead the tension in the part of the driving belt wrapping the control pulley for the upstream section drive will rise and will pull the control pulley 15 upstream. Through the bracket 44 the arm 49 with its slotted end 49a will be moved upstream and thereby push the lever 48 against the action of the thruster 47 and through the link 49b rotate the scoop control lever so as to lift the scoop and reduce the amount of oil in the impeller circuit, thus reducing the capacity of the coupling to transmit torque. Thus there may be substantial power transfer locally, between the two sections, but driving belt tension will not build up from section to section until it rises above acceptable limits. Correspondingly, when the loading upon the downstream section rises, absorbing more of the power being applied to that section, the tension on the part of the driving belt wrapping the control pulley for the upstream section drive will fall and the pulley will move under the action of the springs 46 in a downstream direction thereby moving the slotted arm 49 through the bracket 44. As a result, the thruster 47, which is keeping a constant thrust on the lever 48, can move the lever 48 to the limit of the restraint placed on it by a pin 48a on the lever 48 moving in the slotted end 49a. The movement of the lever 48 moves the scoop control lever so as to lower the scoop and thus add more oil to the impeller circuit and increase the torque transmitted by the coupling. The tension in the upstream conveyor section is thus brought up to the required value.

A maximum value will be decided for the belt tension at the control pulley and the linkage to the associated scoop will be arranged so that, when the belt tension at the control pulley is at a maximum, the position of said scoop will only permit enough torque to be generated to bring the tension at the driving drum up to its maximum, which tension is sufficient to drive its associated section fully loaded.

Braking means may be provided as before.

In this embodiment, the motor drive of the downstream end driving-belt section will normally run always at full scoop insertion, the drive power supplied to this driving belt section thus depending only upon motor slip, i.e., upon conveyor speed.

In the arrangement of FIGS. 7 and 8, when coal, for example, is loaded initially to an empty conveyor, the drive belt at the discharge end will generate maximum tension in the belt, and successive upstream drives will make up the losses incurred in driving the empty sections, bringing the tension up to the maximum value at each drive point. This will be true also of the drive for the section that is being loaded. It will merely top up the loss in the section downstream to it. As the nose of the load travels along the conveyor, the amount of topping up to be done by the motors driving the loaded sections will increase because the tension applied by the final downstream drive will be split over more loaded sections. When the conveyor is fully loaded then all drives will apply maximum tension. When the conveyor starts to unload, i.e., when the tail of the load starts travelling along the conveyor, the effect will be the same. When the upstream section is empty, its motor will continue to apply full tension to the belt and this tension will travel via the return belt to assist the motors of the loaded sections. As the tail of the load travels forward over more sections of the conveyor, then the first motor upstream of the tail of the load will apply maximum tension, the upstream empty sections will top up the losses and the downstream loaded sections will apply a smaller topping-up tension as the number of loaded sections (which benefit from the maximum tension applied by the drive upstream of the tail of the load) decreases.

It will be noted that in both these embodiments a measurement of residual driving-belt tension, that is, an indication of the drive power being transferred by the driving belt to the next section upstream, is used to control a nearby motor drive. The embodiment of FIGS. 7 and 8 has the advantage of simplicity of installation, but requires the driving belt to transfer considerably greater power between adjacent sections. Under the conditions of loading and of load change found in practice, however, the driving-belt tensions in this embodiment also will be found to remain within acceptable limits. It is essential to this embodiment, that the idler drum of the control unit 16 be placed close to the next driving motor upstream. In general, indications derived from the driving belt tension at other points than the upstream end of a driving-belt section may be used to control nearby motor drives, but to the extent that measurements made at other points no longer give a direct indication of power transfer between driving-belt sections but give an indication of the sum of the residual tension from the downstream section and the tension applied by the motor drive for the section concerned more robust control arrangements may be called for. Motor drives may be controlled in dependence upon tension measurements (or other indications dependent upon conveyor-belt loading) obtained at two or more points, and correspondingly, such indications may be employed in the control of more than one motor drive. Thus the two above-described embodiments could be combined.

Referring to the embodiment of FIGURES 9 to 11, a conveyor has an endless driving belt 10 trained in sinuous manner around a series of driving drums 11 spaced apart and each associated with idler pulleys 15 to maintain the belt taut. An endless conveyor belt 17 wraps the driving belt 10 and is itself trained around end drums 18, 19 with the upper and the lower flights of the conveyor belt in engagement with the upper and the lower flights of the driving belt, so that, during rotation of the belt, the conveyor belt is rotated solely by frictional engagement with the driving belt.

A weighing machine 50 is located adjacent to the loading chute 51 of the conveyor and records, either continuously or at pre-determined intervals of time of, for example, 30 seconds, the weight of the material 52 fed to the conveyor. A control unit 53 associated with the weighing machine incorporates spools 54 and 55, between which runs a tape 56, and mechanism 57 for punching in the tape a number of holes 58 dependent on the weight registered at any one time by the weighing machine, the tape 56 being caused to travel in sycnhronism with and at a fraction of the speed of the conveyor belt 17 above a source 58' of light and below light-sensitive scanning units 59 corresponding in number to the number of driving drums 11 of the driving belt 10 and spaced apart distances equivalent to the distances between the driving drums. The tape 56 is driven by passage between two rollers 60, 61, one of which is driven by a chain 62 from a roller 63 engaging the driving belt. The spool 55 is also rotated by a belt 64 from the roller driven by chain 62.

Each scanning unit 59 is operatively connected to a control motor having a control shaft operatively connected in turn to the scoop of a hydraulic coupling of the scoop control type associated with a squirrel cage motor constituting the drive for each driving drum, as hereinbefore described with reference to FIGURES 1 to 6. Each scanning unit is arranged to operate the associated control motor to engage or to withdraw its associated scoop, and thus to vary the speed or power of its associated squirrel cage motor, in dependence on the number of holes 58 in the part of the tape 56 passing under said unit. Items 1 to 8 in FIGURES 9 and 10 represent diagrammatically the control trains between the scanning units 59 and the respective driving drums 11. Each unit may also be operatively connected to brake mechanism similar to that described with reference to FIGURES 1 to 6. Also, there may be provided a centrifugal switch as hereinbefore described.

Thus, any build-up of transferred tension from one part of the conveyor to another is substantially obviated by automatically regulating the speed or power of the motor or motors of a conveyor section or sections in dependence on the weight of material on said section or sections.

It would be possible to construct, from the weighing machine records, a record of the total weight upon a complete driving-belt section, and so to adjust the delay that each motor drive was controlled in precise accordance with the load carried over the associated driving-belt section. In practice, however, the simpler arrangement described above, using a conventional belt-weighing machine weighing a section of conveyor some 12 feet or so in length, gives a sufficiently accurate indication of the loading over a driving-belt section. Furthermore, the delay in applying the control signals need not be very precise. It has been explained in connection with the embodiment of FIGS. 7 and 8, for instance, that adequate control may still be obtained when the control signals are applied to the motor drive of the driving-belt section next to that carrying the loading indicated by those signals. This corresponds to an error in delay of one complete driving-belt section. Local and residual surplus or deficiency of drive power may then be reduced by the methods described in connection with the embodiment of FIGS. 1 to 6 or by some similar arrangement, or merely left to be dealt with by the methods described in the prior patent application mentioned above. The control of FIGS. 9 to 11 could be used to provide the initial settings of the scoops and a control according to FIGS. 7 and 8 to effect any fine corrections required should inaccuracies in the mechanism, variations in friction, etc., cause the positions of the scoops to be slightly incorrect when set by the control unit of FIGS. 9 to 11. All that should normally be aimed at, in the practice of the present embodiment, is that the motor drives should be controlled in reasonable accordance with an approximate indication of the loading over some driving-belt section or sections in the neighbourhood of the drive.

In lieu of squirrel-cage motors, the same effect may be achieved with other motor drives such as slip-ring motors with resistances, variable speed motors, motors with variable speed mechanical devices or motors with hydraulic pumps.

Also, in lieu of a weighing machine there may be provided means for recording the depth of material on the conveyor. In lieu of a tape there may be provided an adjustable cam comprising a disc or a chain fitted with moving blocks set to heights, representative of the load on the conveyor, by mechanical means controlled by the weighing machine or by the depth recording means.

Means, other than those described above, may be used for controlling the power applied to the individual conveyor sections.

For example, the weight, depth or the like of material being fed to the conveyor may be measured on a preceding conveyor(s) or a feeder(s) and the measurement transmitted to the control unit of said first-mentioned conveyor. In lieu of measuring the weight, depth or the like of material on the preceding conveyor(s) or feeder(s), means may be provided for measuring the power consumed by said conveyor(s) or feeder(s), which measurement is a measure of the load on said conveyor(s) or feeder(s), and for transmitting this measurement to the control unit.

Alternatively, the scoop of the hydraulic coupling of the drive of the first section of the conveyor may be maintained fully engaged. The load on this section would then be deduced from the electrical current used at said drive and the tension at the tail of this section, the load on said section being proportional to the difference. This information would then be transmitted to the control unit of the conveyor.

The present embodiment may be applied to conveyors to which material is fed at more than one point, by combining indications of the load fed on at each point, with different delays for the different feeds. Thus the control tape described above could be fed through further punches at appropriate intervals.

Instead of the information regarding measurement and load being transmitted to the control unit and thence to all the individual drives, there may be provided a relay system in which each drive is associated with its own control unit which would be arranged to transmit a delayed signal regarding the load on the associated section to the control unit of the downstream section, the time-lag occurring before transmitting this information being dependent on the time necessary for the material to travel from one section to the other.

I claim:

1. A belt conveyor system comprising an endless conveyor belt; means for driving said belt, said means extending over substantially the whole length and over substantially the whole of at least the central portion of said conveyor belt, said means comprising a plurality of driving belt sections frictionally engaging the conveyor belt; a plurality of motor drives for actuating said driving means and associated with different driving belt sections; control means for controlling the power supplied by said motor drives to their driving belt sections; and means for regulating said control means in dependence on the loading of the conveyor over different driving belt sections to supply more power when neighboring regions of the conveyor are heavily loaded than when they are lightly loaded, thereby limiting the power required to be transferred between driving belt sections.

2. A belt conveyor according to claim 1 wherein said driving belt sections are sections of an endless driving belt.

3. A belt conveyor according to claim 1 wherein said regulating means includes means responsive to changes in driving belt tension to regulate said control means.

4. A belt conveyor according to claim 3 wherein said responsive means comprise control rollers around which the driving belt sections pass.

5. A belt conveyor according to claim 4 wherein means are provided mounting said control rollers for displacement to an extent dependent on the driving belt tension.

6. A belt conveyor according to claim 4 wherein said control rollers are provided adjacent the upstream ends of the driving belt sections.

7. A belt conveyor according to claim 3 wherein a said responsive means is associated with each driving belt section and controls the motor drive for that section.

8. A belt conveyor according to claim 3 wherein a said responsive means is associated with each driving belt section and mechanical means are provided connecting each responsive means with the control means of the motor drive of the next driving belt section upstream.

9. A belt conveyor according to claim 1 wherein said regulating means includes means measuring the load entering a length of the conveyor and regulating said control means in accordance with the measurements, and delay means delaying regulation of each control means by an amount related to the distance between said measuring means and the driving belt section of which the associated control means is being regulated.

10. A belt conveyor according to claim 9 wherein said measuring means comprises means weighing a length of the conveyor.

11. A belt conveyor according to claim 9 wherein said measuring means is disposed adjacent the beginning of the conveyor.

12. A belt conveyor according to claim 9 wherein said delay means includes means for recording said measurements on a serially-operating recording medium, and a plurality of means spaced apart and adapted to be traversed by and derive control signals from said record for regulating said control means.

13. A belt conveyor according to claim 12 wherein said recording means includes means for punching holes in a tape.

14. A belt conveyor according to claim 1 wherein brakes are provided for said motor drives and means are provided for automatically adjusting said brakes in accordance with loads carried at different positions along the conveyor belt whereby the brakes for heavily loaded driving belt sections exert, when actuated, a greater braking effort than the brakes for lightly loaded sections, thereby reducing the power required to be transferred between the driving belt sections.

References Cited

UNITED STATES PATENTS

| 1,313,111 | 8/1919 | Page | 198—203 |
| 1,460,573 | 7/1923 | Church | 198—39 |
| 1,847,152 | 3/1932 | Webb | 198—203 |
| 2,393,563 | 1/1946 | Petterson | 198—203 |
| 2,625,257 | 1/1953 | Schenk | 198—203 |
| 2,863,555 | 12/1958 | Jaritz | 198—203 |
| 2,927,258 | 3/1960 | Leppel | 214—11 |

ANDRES H. NIELSEN, *Primary Examiner.*

RICHARD E. AEGERTER, EVON C. BLUNK,
*Examiners.*